Sept. 6, 1966  T. W. GOWANLOCK  3,271,080
CUTTER BIT ASSEMBLY FOR MINING MACHINES
Filed Feb. 6, 1964  2 Sheets-Sheet 1
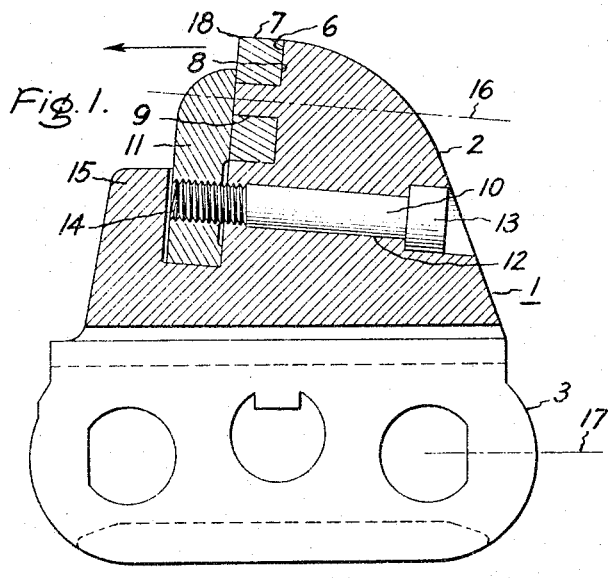
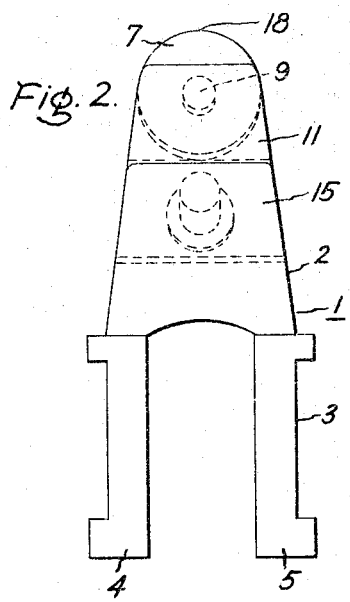
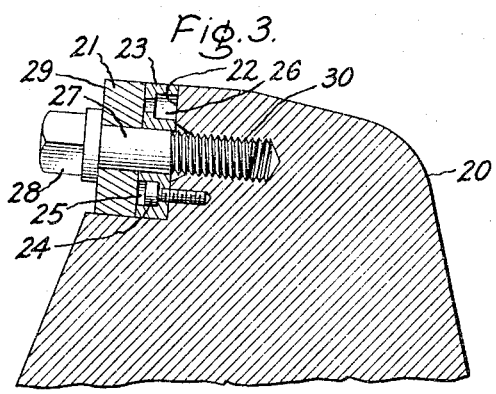
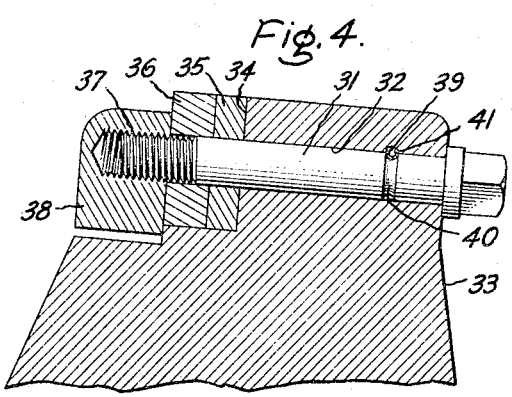
Inventor:
Thomas W. Gowanlock,
by Harold J. Holt
His Attorney

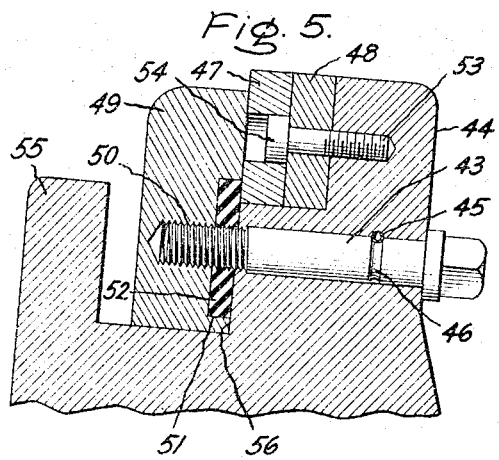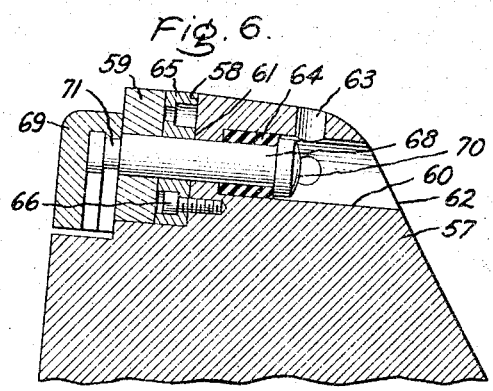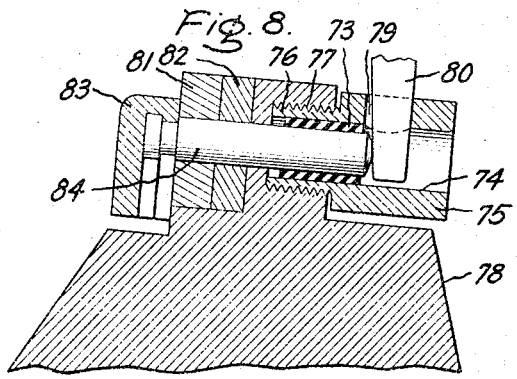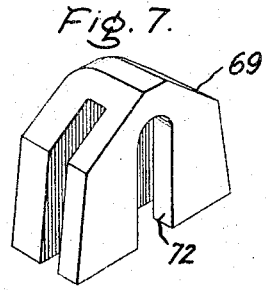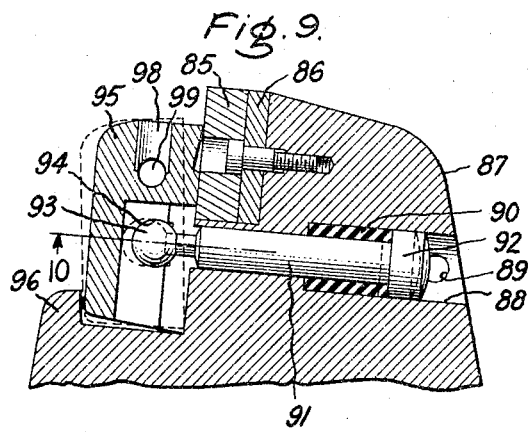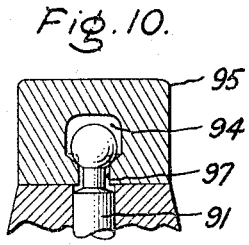
Inventor:
Thomas W. Gowanlock,
by Harold ____
His Attorney.

United States Patent Office 3,271,080
Patented Sept. 6, 1966

3,271,080
CUTTER BIT ASSEMBLY FOR MINING MACHINES
Thomas W. Gowanlock, Detroit, Mich., assignor to General Electric Company, a corporation of New York
Filed Feb. 6, 1964, Ser. No. 343,092
8 Claims. (Cl. 299—92)

This invention relates to cutter bit assemblies for mining machines and, more particularly to such cutter bit assemblies in which a disposable cutter bit is mechanically held and may be conveniently indexed, inverted and replaced.

Present-day mining machines utilize removable cutter bits which are secured to a driving means, such as the links of an endless cutter chain, a rotary drum or other common type of driving means. The cutter bit mounting is usually achieved by brazing the cutter bit to a shank which, in turn, is mounted onto a base member or holder, the holder being attached to the driving means. Because of the relatively high velocity at which the cutter bit moves and because of the heavy impact and abrasion of the cutter bit against the ore face during the mining operation, the cutter bit deteriorates rapidly and often fractures. Replacement of the cutter bit in such prior art machines involves not only the replacement of the cutter bit or actual cutting edge, but, in addition, requires replacement of the shank to which the cutter bit is brazed. Considering that only the actual cutter bit need be replaced, the required replacement of the bit and shank involves an unnecessary financial expenditure. Furthermore, typically the shank for the cutter bit protrudes beyond the holder to permit the cutter but to contact the ore and leave substantial clearance between the ore and the holder. This arrangement provides a cantilever-type cutter bit mounting means which has a significant movement applied thereto during the mining operation. Therefore, the shank must be of substantial strength in order to withstand this moment, thus again increasing the cost of the mining equipment.

A further disadvantage of the prior art mounting means is that only a minor portion of the cutter bit is actually used and, upon deterioration of this minor portion of the cutter bit, the entire bit must be removed and resharpened or disposed of since means are not available for permitting indexing or inversion of the cutter bit to utilize the unused portions thereof. In certain instances, the cutter bit has been mechanically mounted on the holder but the manner in which the bits have been mounted does not permit full utilization of the cutter bit by indexing and inversion of the bit.

Accordingly, it is one object of this invention to provide a cutting tool assembly which permits utilization and easy replacement of a fully disposable cutter bit in a mining machine.

A further object of this invention is to provide a cutting tool for mining machines in which the cutter bit may be rotated, inverted and replaced in relatively inaccessible locations with a minimum of effort.

An additional object of this invention is to provide a cutting tool for mining machines which mechanically holds a disposable cutter bit, or cutter bit and seat, in fully supported position during operation of the mining machine.

The above and other objects of the invention are achieved in a cutter bit assembly for mining machines in which the cutter bit is removably mounted directly onto the base member or holder in fully supported position as distinguished from mounting the bit onto a shank which is inserted into the holder. A seat member may be placed between the cutter bit and the holder to perform what is believed to be a new function in mining tools, namely, protecting the holder in the event of failure of the cutter bit and diffusing the forces acting upon the cutter bit over a wide area of the holder. The seat member and cutter bit are made of a hard cutting material such as hardened steel or cemented carbide. Both the cutter bit and the seat member are held in a recess formed in the front face of the holder by an adjustable clamping arrangement more fully described below. The clamping arrangement permits release of the cutter bit and/or seat member to permit rotation, inversion and replacement of the cutter bit. This provides for effective use of the entire periphery of each surface of the cutter bit as a cutting edge. Furthermore, the invention provides for full support of the cutter bit against the holder and thus eliminates the cantilever mounting arrangement conventionally used in mining machines. The cutter bit assembly of the invention may be used with chain type cutters such as undercutters, with mining machines of the rotating arm type and with chain type continuous mining machines.

In the drawings, FIG. 1 is a sectional side view of a cutter bit mounted on a holder illustrating one embodiment of the present invention.

FIG. 2 is an end view of the cutter bit and holder of FIG. 1.

FIG. 3 is a sectional side view of a cutter bit mounted on a holder illustrating a second embodiment of the present invention.

FIG. 4 is a sectional side view of a cutter bit mounted on a holder illustrating a third embodiment of the present invention.

FIG. 5 is a sectional side view of a cutter bit mounted on a holder illustrating a fourth embodiment of the present invention.

FIG. 6 is a sectional side view of a cutter bit mounted on a holder illustrating a fifth embodiment of the present invention.

FIG. 7 is a perspective view of the clamp head utilized in the embodiment of FIG. 6.

FIG. 8 is a sectional side view of a cutter bit mounted on a holder illustrating a sixth embodiment of the present invention.

FIG. 9 is a sectional side view of a cutter bit mounted on a holder illustrating a seventh embodiment of the present invention.

FIG. 10 is a sectional view illustrating the clamp head mounting employed in the embodiment of FIG. 9.

Referring to the drawings, and more particularly, FIGS. 1 and 2, there is shown a cutter bit mounting assembly including a base member or cutter bit holder 1 having an upper portion 2 for attachment of the cutter bit and a lower portion 3 adaptable to be mounted on the chain of a typical chain type continuous coal mining machine. As illustrated in FIGS. 1 and 2, the lower portion 3 includes a pair of parallel rails 4, 5 adapted to be mounted on an endless cutter chain of the type well-known in the art.

Holder 1 is provided at one end thereof with a recess 6 to receive a cutter bit 7, the recess 6 having a vertical cutter bit supporting surface 8 for fully supporting and engaging the non-cutting surface of the bit against the parallel surface of the recess in the holder.

The cutter bit 7 is preferably of circular cross section and is rotatably mounted on projection 9 extending from vertical surface 8 of the recess 6. Projection 9, together with the clamp, keeps the insert in place and, in addition, provides a bearing surface on which the cutter bit may be rotated for indexing into a new cutting position. To hold the cutter bit 7 securely, but releasably and removably, in the recess 6, a releasable clamping means is provided. The clamping means comprises a clamp bolt 10 and a clamp head 11. A through bore 12 is formed longitudinally through the holder 1 with its axis radially displaced below the axis of the cutter bit. The bore 12 is counterbored so as to provide a receiving portion in which an enlarged driving head 13 on one end of the bolt 10 may be inserted. The other end of the bolt is externally threaded.

The claim head 11 has a recess or bore 14 through the lower portion thereof, the bore being internally threaded to engage the threaded portion of the clamping bolt 10. An upwardly extending projection or protector 15 is formed on the front of the holder 1 to serve as a path clearing member dispersing the accumulated ore dust and chips, thus protecting the clamp head 11 and cutter bit 7 from unnecessary wear. When installing the cutter bit onto the holder, the cutter bit 7 is placed within the recess 6 on the projection 9 and the clamp 11 is slid place between the cutter bit 7 and the protector 15, the bore 14 through the clamp head being aligned with the bore 12 through the holder. The bolt 10 is then inserted through the rear wall of the holder and screwed into the clamp head, forcing the clamp head to abut the cutter bit and engagingly hold it in place against support surface 8. As can be seen from FIGS. 1 and 2, the cutter bit will be supported across substantially its entire diameter as a bit assembly is moved in the direction of the arrow (FIG. 1) in a mining operation.

As may be seen in FIG. 1, the cutter bit is disposed at a slight angle (on the order of 5 degrees) in the holder; i.e., the cutter bit axis 16 intersects a longitudinal axis 17 through the lower portion 3 of the holder at an angle of approximately 5 degrees. The purpose for this angular deviation between the upper and lower portions of the holder is to insure that only the exposed cutting edge 18 of the cutter bit 7 contacts the ore to be mined. Such an angular displacement provides a clearance for the rear edge of the cutter bit and for the holder.

Upon deterioration of the cutting edge 18 of the cutter bit the clamp head 11 may be loosened from its contact with the cutter bit and mere rotation or indexing of the cutter bit 7 will expose an unused portion of the cutter bit providing a new cutting edge. After the cutter bit has been rotated in this manner through 360 degrees thus utilizing all available cutting portions on one side of the cutter bit, the clamp head 11 is removed from the holder 1 and the cutter bit 7 is removed from the recess 6 and inverted or reversed in direction so that the unused face is exposed. This provides a new cutting edge which has been protected during the use of edge 18 and facilitates maximum utilization of the cutter bit.

The second embodiment, illustrated in FIG. 3 is a simplified mounting based upon the same principles illustrated in FIGS. 1 and 2. FIG. 3 illustrates only the upper portion of a holder 20 onto which a cutter bit 21 is mounted. A recess 22 in the holder extends across the width thereof presenting a parallel supporting surface for the cutter bit 21. A seat member 23 is placed between the cutter bit 21 and the holder for the purpose of protecting the holder from destruction or wear in the event of failure of the cutter bit 21 during the mining operation. The seat member 23 is formed of a more ductile material than that used to form the cutter bit in order to permit the seat member not only to protect the holder but also to diffuse the forces acting upon the cutter bit before they act upon the holder. A carbide or steel seat member may be used in combination with a cemented tungsten carbide cutter bit.

The cutter bit 21 as well as the seat member 23 is formed as an annulus to attain maximum utilization of these members through indexing and, furthermore, to economize on the quantity of material used in these members since that portion which is not actually used for cutting is eliminated in this design.

The seat member 23 is bolted to the holder 20 by providing a counterbore 24 axially through the seat member into which a seat member mounting screw 25 is inserted. As may be seen in FIG. 3, a plurality of counterbores may be used, some of which are counterbored from one face of the seat member 23, for example bore 24, while others are counterbored from the other face of the seat member, for example bore 26. This permits bolting of the seat member 23 to the holder 20 regardless of which face of the seat member is adjacent the holder thus facilitating installation.

The cutter bit 21 is mounted on the seat member 23 and holder 20 by a clamp bolt 27, the bolt being externally threaded at one end and having an enlarged head 28 at the other end to abut against and protect the exposed face 29 of the cutter bit 21. The threaded end is engagingly received in an internally threaded bore 30 extending partially through the holder 20. The cutter bit may be indexed to provide a new cutting edge by merely partially unscrewing the bolt 27 from the holder and rotating the cutter bit 21 until a new edge is exposed. Reversal or replacement of the cutter bit 21 is easily accomplished by removal of the bolt 28, a rather simple operation involving a minimum of time, effort, and working space.

A third embodiment, illustrated in FIG. 4 utilizes a clamp bolt 31 passing through a longitudinal bore 32 extending the length of the holder 33. A recess 34 is provided in the holder to receive an annular seat member 35 and an annular cutter bit 36 such that the aperture of each of these members is aligned with the longitudinal bore 32. The clamp bolt 31 is of sufficient length to enable it to pass through the seat member 35 and annular cutter bit 36 and extend beyond the exposed face of the cutter bit. The extending portion of the bolt 31 is externally threaded as at 37 and is received by an internally threaded clamp head 38. This mounting utilizes the shank of the bolt as a bearing on which the seat member 35 and cutter bit 36 may rotate in addition to using the bolt as an integral part of the clamping means.

In order to effect longitudinal movement of the clamp head 38 towards and away from the cutter bit 36 by rotation of the bolt 31, it is desirable to prevent axial movement of the bolt 31 relative to the holder 33. This is achieved by providing a second bore 39 in the holder 33 transverse to the longitudinal bore 32 and by providing an annular groove 40 around the bolt periphery, the bore 39 and the groove 40 intersecting when the bolt 31 is properly inserted in the holder. A roll pin 41 is inserted through the second bore 39 and is engagingly received by the annular groove 40 thus preventing axial movement of the bolt 31 while permitting rotational movement thereof. Counterclockwise rotation of the bolt 31 effects translation of the clamp head away from the cutter bit and permits indexing of the cutter bit and seat member resulting in the exposure of a new cutting and support surface respectively. Further rotation of the bolt 31 effects removal of the clamp head 38 from the bolt 31 to allow replacement of the seat member 35 and cutter bit 36. After insertion of a new seat member and cutter bit into the recess 34, rotation of the bolt draws the clamp head tightly against the cutter bit, holding the cutter bit and seat firmly in the recess 34.

Counterbores (not shown) as disclosed in the second embodiment above may be employed for attaching the seat member 35 to the holder, thus permitting removal of the cutter bit 36 while retaining the seat member 35 in place.

FIG. 5 illustrates a fourth embodiment which similarly utilizes a bolt 43 inserted through a bore extending longitudinally through the holder 44. The bolt 43 is held in place and axial movement thereof is prevented by a roll pin 45 passed through a second bore extending through the holder 44 transverse to the bolt 43 and its longitudinal bore and intersecting the periphery thereof. The roll pin 45 is received by an annular groove 46 provided around the periphery of the bolt 43 in the same manner as disclosed above with respect to the embodiment shown in FIG. 4. One end of the bolt 43 is threaded and protrudes from the front wall of the holder 44 beyond an annular cutter bit 47 and annular seat member 48.

A clamp head 49 has an internally threaded bore 50 therein to receive the protruding threaded portion of the bolt 43. The bore 50 is counterbored, as at 51, to receive a sealing means 52, such as a rubber pad or gasket, in order to keep the dust and chips away from the threaded portion of the bolt and clamp head.

An ancillary mounting means for holding the seat member 48 in the recess is provided in the form of a screw 53 having an enlarged head 54. The screw shank passes through the annular seat member aperture and is received by an internally threaded bore in the holder, while the head 54 of the screw 53 abuts the face of the seat member and lies within the aperture of the annular cutter bit 47. In order to obtain such a mounting, the internal diameter of the cutter bit 47 must be larger than that of the seat member 48.

A projection or stop 55 extends upwardly from the holder so as to limit the longitudinal motion of the clamp head 49. The stop 55 is spaced from the front wall 56 of the holder 44 and from the exposed face of the cutter bit sufficiently to permit the clamp head 49 to be displaced from the cutter bit, thus allowing indexing or removal of the cutter bit and seat member and yet the stop 55 is close enough to the cutter bit to prevent the clamp head from being removed from the bolt 43 without removal of the roll pin 45 and the bolt 43 from the holder. The stop 55 thus serves a dual purpose, to prevent loss of the clamp head and to disperse the accumulated debris, thus prolonging the life of the clamp head and cutter bit.

Operation of the clamping means is the same as that disclosed in the embodiment of FIG. 4, that is, rotation of the bolt 43 causes the clamp head to translate toward or away from the cutter bit to either hold the cutter bit and seat member in place or release them.

FIG. 6 illustrates an embodiment which utilizes many of the various features disclosed with respect to the first four embodiments but wherein the clamp head can be loosened and removed by simple radial reciprocating motion of the clamp bolt.

A base member or holder 57 has a recess 58 formed therein extending across the width of the holder and extending downwardly a distance equal to the diameter of the cutter bit 59. A counterbore 60 is provided in the holder having a first diameter from the front wall 61 of the recess 58 to a point within the holder 57 and an enlarged second diameter from that point to the rear wall 62. At least one port 63 is provided through the upper portion of the holder transverse to the counterbore 60 and intersecting that bore. A resilient tubular member 64, such as a rubber sleeve or spring, is inserted within the enlarged portion of the bore 60 to form a restraining means for a bolt which is received therein. An annular seat member 65 is placed within the recess 58 and held in place by at least one mounting screw 66 and annular cutter bit 59 is then placed within the recess 58 and abutting one face of the seat member 65, the cutter bit and seat member being aligned with the counterbore 60 and having an inner diameter substantially the same as the first diameter of the counterbore.

The cutter bit and seat member are held in place by clamping means including a bolt 68 and a clamp head 69. The bolt 68, having an enlarged hemispherical head 70 on one end thereof, is inserted in the bore 60 and passes through the cutter bit 59 and seat member 65, the head 70 abutting the resilient member 64. The port 63 is located within the holder 57 such that when the bolt 68 is inserted in the bore 60 and the head 70 is abutting the resilient member 64 the end of the head 70 is aligned with the port 63. The other end of the bolt 68 extends beyond the exposed face of cutter bit 59 and has an annular groove 71 cut circumferentially about the protruding portion. The clamp head 69 comprises a C-shaped member (see FIG. 7) having a slot 72 through one face thereof. The C-shaped clamp head 69 is fitted over the protruding end of the bolt 68 such that the slot 72 mates with the groove 71 formed on the bolt 68 as may be seen in FIG. 6. The resilient sleeve 64, via the bolt, biases the clamp head 69 into abutting relationship with the cutter bit 59, thus forceably holding the cutter bit 59 and seat member 65 in the recess 58. The clamp head can be formed of substantial size so as to provide protection for the face of the cutter bit in addition to mounting it on the holder 57.

When it is desired to index or remove the cutter bit 59 a tool, such as a drift pin, is inserted through the port 63 contacting the bolt head 70. As mentioned above, the bolt head 70 is hemispherical to facilitate drifting of the tool into position behind the bolt 68. Applying a force on the bolt head in the direction towards the cutter bit 59 compresses the resilient member 64 and forces the clamp head 69 away from the cutter bit thus permitting rotation of the cutter bit and seat member about the bolt 68, the bolt shank serving as a bearing. Replacement of the cutter bit 59 and seat member 65 is accomplished by removing the clamp head 69 from the bolt 68 by slipping it off.

FIG. 8 illustrates an embodiment very similar to that illustrated in FIG. 6 wherein the resilient member, as well as the remainder of the working parts, can be easily replaced without removing the holder or base member from the mining machine. This embodiment involves bonding a hollow resilient member 73 within a longitudinal bore 74 provided in a plug 75. The plug has an externally threaded protrusion 76 on one end thereof, to be received by an internally threaded countersunk bore 77 provided longitudinally through the holder 78. This is distinguished from the embodiment illustrated in FIG. 6 wherein the sleeve 64 is removably placed immediately within the bore of the holder 57. At least one port 79 extends transversely through the plug 75 and intersects the bore 74, the port 79 being adapted to receive a tool such as a drift pin 80. A cutter bit 81 and seat member 82 are inserted in the holder 78 in the same manner as disclosed with respect to the embodiment of FIG. 6. The clamping means includes a C-shaped clamp head 83 removably mounted on a bolt 84. The bolt 84 is bonded to the interior surface of the resilient member to form a unitary assembly comprising the plug 75, resilient member 73 and bolt 84 which is inserted in the countersunk bore 74. This unitary assembly facilitates handling of the various elements forming the cutting bit assembly in areas where the working space is limited. The cutter bit 81 and seat member 82 may be indexed by forcing the clamp head 83 away from the cutter bit through the action of drift pin 80 on the end of the bolt 84. The biasing effect of the resilient member 73 on the bolt returns the bolt and clamp head to the clamping position on extraction of the drift pin. Removal of the clamp head 83 from the bolt 84 permits replacement of the cutter bit 81 and seat member 82.

FIG. 9 illustrates a still different embodiment of the invention wherein a cutter bit 85 and a seat member 86 are mounted on holder 87. A countersunk longitudinal bore 88 is provided through the holder 87 and a port 89 extends through the holder transverse to and intersecting the bore 88. A hollow resilient tubular member 90 is mounted within the counterbore 88 and a bolt 91 having an enlarged head 92 at one end thereof is inserted within the counterbore and resilient member.

The front end of the bolt 91 extends forward beyond the exposed face of the cutter bit 85 and has a ball 93 thereon. A socket 94 is formed in a clamp head 95 to receive the ball 93, thus providing a swivel mounting for the clamp head 95 on the bolt 91. A projection or stop 96 is formed on the holder 87 and extends upwardly to limit longitudinal swivel movement of the clamp head 95 to prevent damage to the swivel mounting. The stop 96 additionally serves to clear a path through accumulated debris as described above, in connection with FIG. 5, thus protecting the clamp head 95 and cutter bit 85. The stop 96, while being spaced from the cutter bit 85 sufficiently to permit limited pivoting of the clamp head 95 away from the cutter bit 85 to allow indexing or removal of the cutter bit and seat member 86, is located sufficiently close to the cutter bit to prevent inadvertent removal of the clamp head from the bolt.

As may be seen in FIG. 10, the clamp head 95 may be removed from the bolt 91 by sliding the clamp head upwardly, thus allowing the bolt to pass through a groove 97 provided through the inner face of the clamp head. A slot 98 is provided in the upper edge of the clamp head 95 to provide for insertion of a tool such as a drift pin for pivoting the clamp head away from the cutter bit. A cleaning port 99 extends through the side of the clamp head transverse to and intersecting the slot 98 to facilitate cleaning out of any debris accumulated in the slot 98 during the mining operation.

In the embodiments disclosed herein the upper portion of the holder is angularly displaced with respect to the lower portion. This feature is desirable to ensure that only the forward edge of the cutter bit contacts the ore during the mining operation, thus protecting the rear edge of the cutter bit, the seat member, and the holder. Additionally, while the cutter bits and seat members have been illustrated as preferably having a circular cross section, they could also have a square, hexagonal or other polygonal cross section.

It should be noted while many of the above-discussed features were disclosed with respect to one particular embodiment, they could be employed on other of the embodiments. For example, each of the various ancillary seat member mounting means or screws disclosed could be used on several of the other embodiments. Also, the sealing gasket 52 disclosed in the embodiment of FIG. 5 could be used in each embodiment using a threaded bolt-clamp connection. Similarly, the projection or stop member disclosed in FIGS. 1, 5 and 9 could be used on the embodiments illustrated in FIGS. 4, 6 and 8.

What I claim as new and desire to secure by Letters Patent of the United States is:

1. A cutter bit assembly for mining machines comprising in combination
    a cutter bit holder adapted at a first end thereof for attachment to a mining machine, the other end thereof having a recess to receive a disposable cutter bit, said recess having a first and second supporting surface for said cutter bit at substantially right angles to each other,
    said disposable cutter bit having two opposite parallel surface and an edge surface therebetween perpendicular to both said opposite parallel surfaces to provide a plurality of cutting edges on both said parallel surfaces, the cutter bit mounted for rotatable adjustment in said recess at a negative rake angle with one of said parallel surfaces fully supported by the first parallel surface of the recess of the cutter bit holder and a portion of the edge surface of said cutter bit resting on the second supporting surface of said recess,
    the dimension of said cutter bit holder along the cutter bit axis being substantially in excess of the width of said cutter bit along the cutter bit axis so as to provide substantial structural support for the cutter bit in the direction of the cutting forces, said cutter bit being indexable and invertible in the recess of said holder for full utilization of said cutting edges on both parallel surfaces of said cutting insert, and
    clamping means for securely retaining said cutter bit in said recess, said clamping means being releasable for rotation and inversion of said cutter bit in said cutter bit holder.

2. The cutter bit assembly of claim 1 in which a separate cutter bit seat is mounted in the recess of said holder between said insert and the parallel supporting surface of said recess, said cutter bit seat having a configuration and dimensions substantially similar to that of said insert.

3. The cutter bit assembly of claim 2 in which the seat is removably retained in said cutter bit holder by securing means independent from said clamping means for retaining the cutter bit.

4. The cutter bit assembly of claim 1 in which the cutter bit is in the shape of a right cylinder.

5. The cutter bit assembly of claim 4 in which the cutter bit has a central hole therein.

6. A cutter bit assembly for mining machines comprising in combination
    a cutter bit holder adapted at one end thereof for attachment to a mining machine, the other end thereof having a recess to receive a disposable cutter bit,
    a disposable cutter bit mounted for rotatable adjustment in said recess, said cutter bit having an exposed cutting edge on one surface thereof and an opposite surface fully supported in said recess by a parallel surface of the recess of the cutter bit holder and
    clamping means for securely retaining said cutter bit in said recess, said clamping means comprising a clamp head bearing against the exposed surface of said cutter bit, an axially aligned clamping bolt removably engaging said clamp head at one extremity of said bolt, said bolt at the other extremity thereof being resiliently engaged against axial movement by a resilient member disposed adjacent said other extremity, said clamp head being releasable for rotation and inversion of said cutter bit in said cutter bit holder by axial displacement of said clamping bolt against said resilient member.

7. The cutter bit assembly of claim 6 in which said clamp head is C-shaped, the clamp head being removable in a radial direction through the open end of said C-shaped clamp upon axial displacement of said clamping bolt against said resilient member.

8. The cutter bit assembly of claim 6 in which said clamp head is C-shaped and said clamping bolt contains an enlarged head at one axial extremity thereof for engagement with said C-shaped clamp.

References Cited by the Examiner
UNITED STATES PATENTS

| | | | |
|---|---|---|---|
| 1,782,172 | 11/1930 | Levin | 299—93 |
| 2,190,674 | 2/1940 | Osgood | 299—93 |
| 2,575,239 | 11/1951 | Stephens | 175—383 |
| 2,581,609 | 1/1952 | Small | 125—39 |
| 2,720,717 | 10/1955 | Arps | 299—83 X |
| 3,024,856 | 3/1962 | Henning | 175—413 X |

ERNEST R. PURSER, *Primary Examiner.*